(12) United States Patent
Stahlfeld

(10) Patent No.: US 9,875,287 B1
(45) Date of Patent: Jan. 23, 2018

(54) PROVIDING A NOTIFICATION IN PLACE OF CONTENT ITEM

(71) Applicant: Google Inc., Mountain View, CA (US)

(72) Inventor: Phillip E. Stahlfeld, Mountain View, CA (US)

(73) Assignee: Google Inc., Mountain View, CA (US)

( * ) Notice: Subject to any disclaimer, the term of this patent is extended or adjusted under 35 U.S.C. 154(b) by 866 days.

(21) Appl. No.: 14/283,570

(22) Filed: May 21, 2014

(51) Int. Cl.
 *G06F 17/30* (2006.01)

(52) U.S. Cl.
 CPC .............. *G06F 17/30554* (2013.01)

(58) Field of Classification Search
 CPC ............................................. G06F 17/30554
 USPC ....................................................... 707/722
 See application file for complete search history.

(56) References Cited

U.S. PATENT DOCUMENTS

| | | | |
|---|---|---|---|
| 2007/0198443 A1 | 8/2007 | Chemev et al. | |
| 2008/0109401 A1* | 5/2008 | Sareen | G06F 17/30864 |
| 2008/0114607 A1* | 5/2008 | Amer-Yahia | G06Q 30/0241 |
| | | | 705/14.4 |
| 2008/0114672 A1* | 5/2008 | Yahia | G06Q 40/04 |
| | | | 705/37 |
| 2008/0114759 A1* | 5/2008 | Yahia | G06Q 30/02 |
| 2008/0256061 A1* | 10/2008 | Chang | G06Q 30/02 |
| 2009/0187515 A1* | 7/2009 | Andrew | G06F 17/3064 |
| | | | 706/12 |
| 2009/0240683 A1* | 9/2009 | Lazier | G06F 17/30864 |
| 2010/0161416 A1* | 6/2010 | Chung | G06Q 30/0255 |
| | | | 705/14.53 |
| 2010/0306228 A1* | 12/2010 | Carpenter | G06F 17/3064 |
| | | | 707/765 |
| 2011/0078243 A1* | 3/2011 | Carpenter | G06F 17/246 |
| | | | 709/204 |
| 2011/0083167 A1* | 4/2011 | Carpenter | G06F 17/30563 |
| | | | 726/4 |
| 2011/0191321 A1* | 8/2011 | Gade | G06F 12/08 |
| | | | 707/709 |
| 2012/0047025 A1* | 2/2012 | Strohman | G06F 17/3064 |
| | | | 705/14.71 |
| 2013/0046613 A1 | 2/2013 | Farahat et al. | |
| 2014/0172562 A1* | 6/2014 | Weatherford | G06Q 30/0256 |
| | | | 705/14.54 |

FOREIGN PATENT DOCUMENTS

WO 2007/084246 7/2007

\* cited by examiner

*Primary Examiner* — Joshua Bullock
(74) *Attorney, Agent, or Firm* — Fish & Richardson P.C.

(57) ABSTRACT

Methods, systems, and apparatus include computer programs encoded on a computer-readable storage medium, including a method for providing content. A request for content is received from a user device. One or more candidate content items that are responsive to the request are identified from an inventory of content items. For each candidate content item, an expected performance measure associated with a respective candidate content item is determined. The expected performance measure for each respective candidate content item is compared to a predetermined threshold. When none of the candidate content items have an expected performance measure that exceeds the threshold, a notification is generated, including generating one or more queries, responsive to the request for inclusion in the notification. The notification is provided responsive to the request and for presentation to the user in lieu of a content item.

20 Claims, 4 Drawing Sheets

PROVIDING A NOTIFICATION IN PLACE OF CONTENT ITEM

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented.

SUMMARY

In general, one innovative aspect of the subject matter described in this specification can be implemented in methods that include a computer-implemented method for providing content. The method includes receiving a request for content from a user device. The method further includes identifying, from an inventory of content items, one or more candidate content items that are responsive to the request. The method further includes determining, using one or more processors, for each candidate content item, an expected performance measure associated with a respective candidate content item. The method further includes comparing, using one or more processors, the expected performance measure for each respective candidate content item to a predetermined threshold. The method further includes: when none of the candidate content items have an expected performance measure that exceeds the threshold, generating a notification, including generating one or more queries, responsive to the request for inclusion in the notification. The method further includes providing, in lieu of a content item and for presentation to the user, the notification responsive to the request.

These and other implementations can each optionally include one or more of the following features. Determining, for each candidate content item, an expected performance measure can include determining a measure of likelihood of interaction with a respective candidate content item. Determining, for each candidate content item, an expected performance measure can include determining an expected revenue associated with an impression of a respective candidate content item. Generating the notification can include generating a notification that includes an explanation as to why the notification was shown. Generating the notification can include evaluating the request to determine the one or more queries. The method can further include receiving input responsive to providing the notification, and selecting a content item to deliver from inventory based on the received input. Generating the one or more queries can include generating a query based on a category or topic that is likely to receive user input. The category or topic can be selected without regard for information that is received with the request. The method can further include determining an incentive to offer, and providing the incentive along with the notification. The incentive can be determined based on a category of query or one or more specific content items that relate to the query and that may be provided upon interaction by the user responsive to presentation of the notification.

In general, another innovative aspect of the subject matter described in this specification can be implemented in computer program products that include a computer program product tangibly embodied in a computer-readable storage device and comprising instructions. The instructions, when executed by one or more processors, cause the processor to: receive a request for content from a user device; identify, from an inventory of content items, one or more candidate content items that are responsive to the request; evaluate the candidate content items including determining, for each candidate content item, an expected performance measure associated with a respective candidate content item, and comparing the expected performance measure for the respective candidate content item to a predetermined threshold; when none of the candidate content items have an expected performance measure that exceeds the threshold, generate a notification for publication responsive to the request, wherein the notification includes one or more queries for the user, and wherein generating the notification includes generating the one or more queries; and provide the notification responsive to the request.

These and other implementations can each optionally include one or more of the following features. Determining, for each candidate content item, an expected performance measure can include determining an expected click-through rate or other measure of likelihood of interaction with a respective candidate content item. Determining, for each candidate content item, an expected performance measure can include determining an expected revenue associated with an impression of a respective candidate content item. Generating the notification can include generating a notification that includes an explanation as to why the notification was shown. Generating the notification can include evaluating the request to determine the one or more queries.

In general, another innovative aspect of the subject matter described in this specification can be implemented in systems, including a system comprising one or more processors and one or more memory elements including instructions. The instructions, when executed, cause the one or more processors to: receive a request for content from a user device; identify, from an inventory of content items, one or more candidate content items that are responsive to the request; evaluate the candidate content items including determining, for each candidate content item, an expected performance measure associated with a respective candidate content item, and comparing the expected performance measure for the respective candidate content item to a predetermined threshold; when none of the candidate content items have an expected performance measure that exceeds the threshold, generate a notification for publication responsive to the request, wherein the notification includes one or more queries for the user, and wherein generating the notification includes generating the one or more queries; and provide the notification responsive to the request.

These and other implementations can each optionally include one or more of the following features. Determining, for each candidate content item, an expected performance measure can include determining an expected click-through rate or other measure of likelihood of interaction with a respective candidate content item. Determining, for each candidate content item, an expected performance measure can include determining an expected revenue associated with an impression of a respective candidate content item. Generating the notification can include generating a notification that includes an explanation as to why the notification was shown. Generating the notification can include evaluating the request to determine the one or more queries.

Particular implementations may realize none, one or more of the following advantages. In response to receiving a request for content (such as to fill slots on a resource or to provide additional content along with search results), candidate content items that are identified responsive to the request may have a predicted performance metric that is below a threshold. For example, when little is known about the user/viewer or when the request includes selection criteria that are too vague or otherwise problematic, the quality of the candidate items may be poor, leading to poor performance. In particular situations, such as when little is known about a viewer, content item selection for content to be included in a slot in a resource or other location can be better served when a notification is presented rather than a traditional content item. In these situations, presentation of content items (e.g., advertisements) that are unlikely to lead to user interactions or expected performance for an associated content item. The notification can enable information to be gathered so as to increase the information that is known about the user, such information then supporting future selection of relevant content items.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for providing a notification in place of available content items in response to received requests for content. The notification can be provided, for example, if search query terms for a request for content are too broad or ambiguous, resulting in identification of content items having a low expected performance measure. For example, a determination can be made that query terms have historically led to providing low-performing content items (e.g., advertisements), or bids, in an auction, for the content items may be too low. Moreover, the likelihood of interaction by a user (or an expected click-through rate (CTR)) may be below a predefined threshold. In some implementations, other reasons can exist for not being able to identify content items that have expected performance measures exceeding a performance threshold. For example, the user may visit a web page for which useful keywords cannot be identified for creating a request for content, or the user may be unknown, such as if user profile information does not exist for the user. In another example, the web page visited by the user can be in a language that is not the user's primary language.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 1:
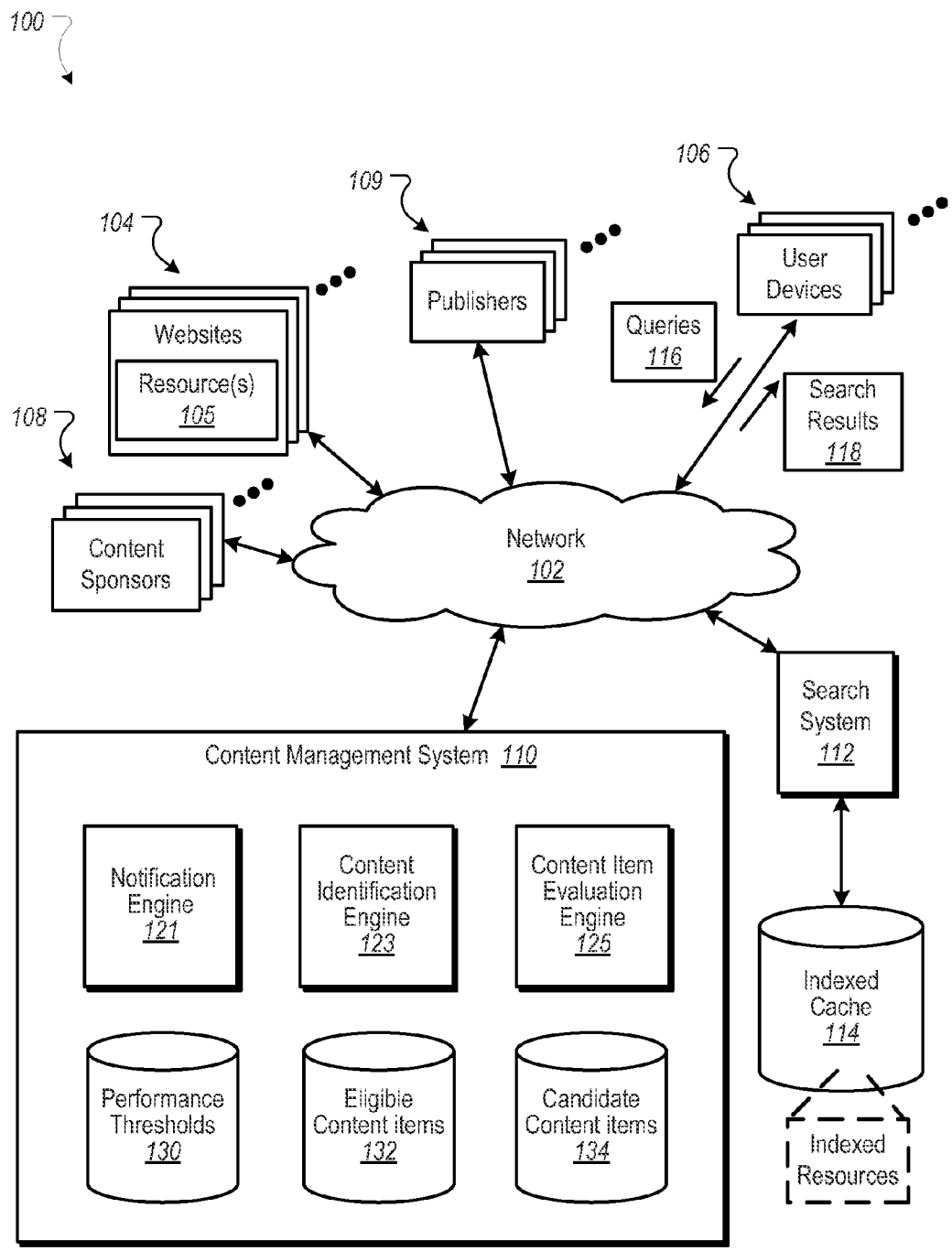
FIG. 1 is a block diagram of an example environment for providing content.

FIG. 1 is a block diagram of an example environment 100 for providing content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. Further, some data stores described herein may include identifiers that can be used to match or access corresponding data records or other information that are stored elsewhere, e.g. locally and/or remotely.

A data store of performance thresholds 130, for example, can include minimum estimated CTRs or other estimated user interaction values or performance metrics with which a candidate content item's expected performance measure can be compared. For example, values for the performance thresholds 130 can be used to determine when a notification is to be provided in response to a request for content, e.g., instead of one or more content items that have low expected performance measures.

A data store of eligible content items 132, for example, can include eligible content items (e.g., advertisements) that can be selected in response to a received request for content. For example, eligible content items may be deemed to be eligible, at least in part, by matching keywords and/or other selection information. The data store of eligible content items 132 can include, for example, an inventory of content items (e.g., creatives) provided by content sponsors 108 for presentation to users.

A data store of candidate content items 134, for example, can include eligible content items that the content management system 110 has identified as being responsive to a request for content. For example, the candidate content items 134 associated with a given request for content can include content items that match keywords for the request and/or other signals (e.g., user information, location, etc.).

The content management system 110 can include plural engines, some or all of which may be combined or separate, and may be co-located or distributed (e.g., connected over the network 102). A notification engine 121, for example, can generate a notification for publication responsive to a request for content. For example, the notification can include one or more queries for the user, and generating the notification can include generating the one or more queries.

A content identification engine 123, for example, can identify candidate content items from the inventory of eligible content items 132 that are responsive to a received request for content. For example, the content identification engine 123 can identify candidate content items 134 using the eligible content items 132, the identification performed, at least in part, by matching keywords or other information in or associated with the request for content.

A content item evaluation engine 125, for example, can evaluate the candidate content items 134, including determining, for each candidate content item, an expected performance measure associated with a respective candidate content item. The content item evaluation engine 125 can also compare the expected performance measure for the respective candidate content item to a predetermined threshold. For example, the content item evaluation engine 125 can determine, for each content item, an expected performance measure that indicate a likelihood of user interaction (e.g., expected click-through rate (CTR)) if presented with the content item. The content item evaluation engine 125 can compare, for example, the determined expected performance measures with a predetermined threshold.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In addition, when no search is performed or no keywords are available (e.g., because the user is not browsing a webpage), other information, such as information obtained from one or more snapshots, can be used to respond to the received request. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
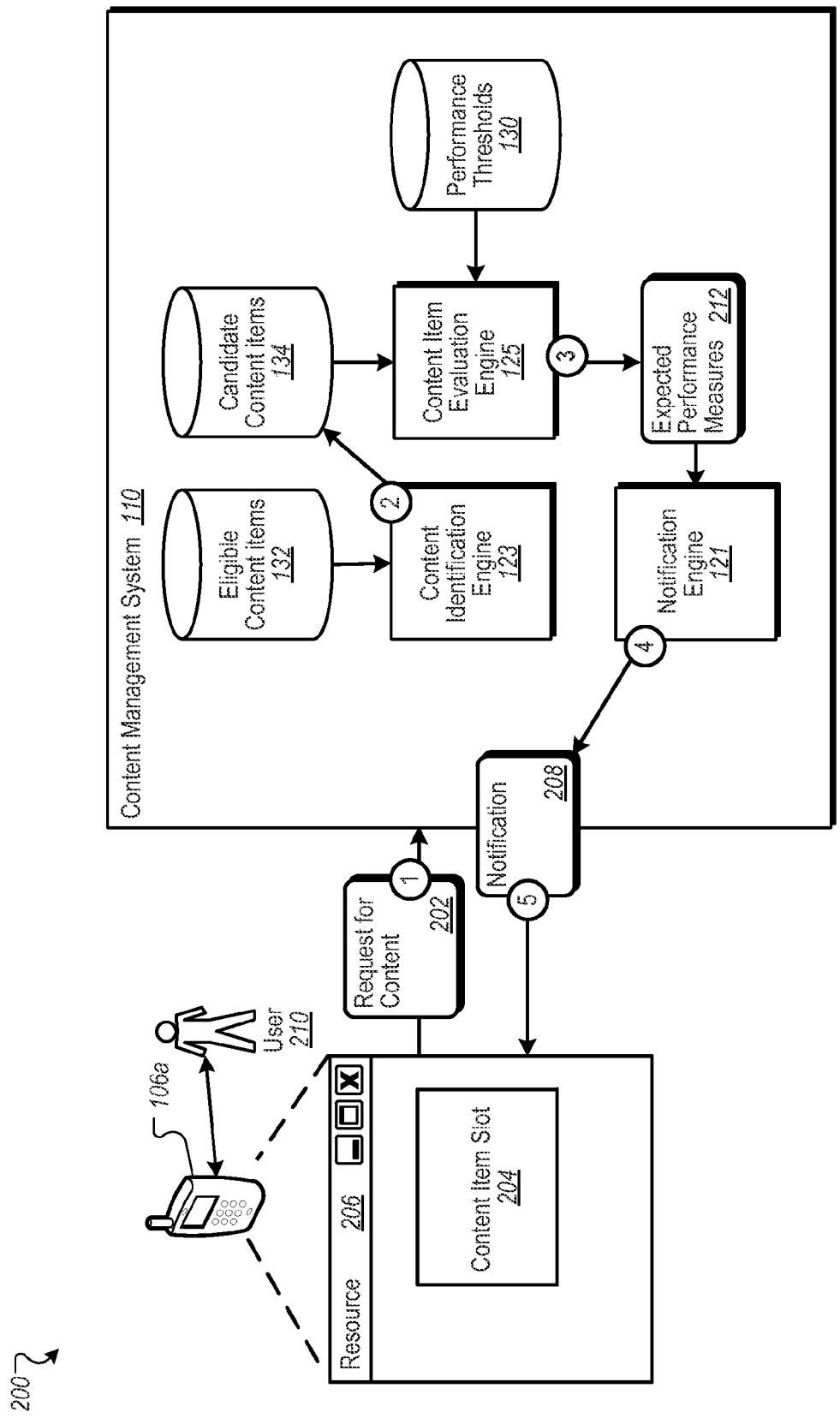
FIG. 2 shows an example system, including showing interactions/data flow, for providing a notification, provided instead of available content items having expected performance measures exceeding a performance threshold.

FIG. 2 shows an example system 200, including showing interactions/data flow, for providing a notification in certain instances instead of available content items when those available content items have an expected performance measure(s) that does not exceed a performance threshold. Specifically, the notification can be provided instead of a content item that would otherwise be selected, e.g., when sufficient information about the user does not exist in order to make the selection particularly relevant to the user. For example, the content management system 110 can receive a request for content 202 from a user device 106. The request for content 202, for example, can be a request for a content item (e.g., an advertisement) to fill a content item slot on a resource 206. If the content management system 110 cannot identify a candidate content item responsive to the request for content 202 and that has a sufficient estimated performance measure, then a notification 208 can be provided instead. For example, the notification 208 would be provided if the expected performance values of candidate eligible content items do not exceed the performance threshold (e.g., are below a pre-determined performance value). Performance may be expected to be low, for example, if search query terms for a request for content are too broad or ambiguous, that may result in identification of content items having a low expected performance measure. For example, overly broad search query terms may return too many results, such results relating to a variety of contexts (and hence may be too unfocused to produce interactions when used as a basis for selection of additional content to be provided along with search results).

At stage 1, for example, the content management system 110 can receive the request for content 202 from the user device 106a. For example, the request for content 202 can be sent from a user device 106a, such as to fill the content item slot 204 (e.g., an ad slot) on the resource 206 being viewed by a user 210.

At stage 2, for example, the content identification engine 123 can identify one or more candidate content items 134 from an inventory of eligible content items 132 that are responsive to the request for content 202. For example, the candidate content items 134 can be identified, at least in part, by matching keywords or other information in the request for content 202, as described above with reference to FIG. 1.

At stage 3, for example, the content item evaluation engine 125 can evaluate the candidate content items 134 including determining, for each candidate content item, an expected performance measure 212 associated with a respective candidate content item and comparing the expected performance measure 212 for the respective candidate content item to a predetermined threshold. For example, the content item evaluation engine 125 can determine, for each content item, expected performance measures that indicate a likelihood of interaction by the user 210 or (an expected click-through rate (CTR)). The content item evaluation engine 125 can compare, for example, the determined expected performance measures 212 with a predetermined threshold, e.g., one of the performance thresholds 130.

At stage 4, for example, when none of the candidate content items 134 have an expected performance measure 212 that exceeds the threshold, the notification engine 121 can generate the notification 208 for publication responsive to the request. The notification 208 can include one or more queries for the user, and generating the notification 208 can include generating the one or more queries.

At stage 5, for example, the content management system 110 can provide the notification 208 responsive to the request for content 202. For example, the notification 208 can be provided to the user device 106a for display in the content item slot 204.

In some implementations, notifications 208 can include different types of information. For example, a notification can include a statement as to why the notification was presented. Notifications can also include a call to action that identifies one or more actions for the user to complete, e.g., answering a question, completing a survey, or some other action. For example, the notification 208 can include language along the lines of, "We respect your time and like to give you interesting ads, though we could not find one this time. Do you want to participate in a survey?" In this example, upon user participation in the survey (e.g., after selecting a control), survey questions can be presented that are based on limited information that may be known about the user, the user's location, the resource 206 that is presented, keywords that were part of the request for content 202, and/or other signals.

In some implementations, specific questions can be asked, such as brand-related questions (e.g., "Do you care about Example Brand running shoes?"). In some implementations, information and/or a question can be included in the notification 208 that is related, for example, to a high-performing ad or a content-presentation goal that currently exists. In this way, upon receipt of a designation of interest from the user responsive to the notification, a high-performing content item can be immediately provided. In some implementations, the notification 208 can be replaced with (or provide a link to) a landing page that can present, to the user 210, follow-up questions or other information. In some implementations, generic questions can be included in the notification 208, e.g., that can be used to learn more information about the user 210.

In some implementations, various methods can be used to select queries for inclusion in the notification. A number of queries can be determined. The number can be based on a size of the presentation area or historical information for successful notifications (e.g., two-question notifications perform better in this scenario than three-question notifications). Further, types of queries can be determined based on the information known about the user or the request, or based on historical data related to prior notifications. For example, one or more best-performing queries can be selected for inclusion in the notification. In some implementations, diversity of queries may be desirable, and accordingly, a determination may be made for both when plural queries are to be included and how diverse each should be. In some implementations, information available for the website can be used in constructing the notification. For example, if the website is written in Spanish, then the notification can also be written in Spanish.

In some implementations, notifications 208 may be unrelated to specific content or questions about content, and unrelated to the original content item request. For example, the notification 208 can include generic questions. In another example, the notification 208 can present an incentive to the user to participate in a question/survey activity, such as by offering a coupon, a promise to temporarily suspend the presentation of ads on the particular resource 206, and/or other user rewards in response to completion of the question(s)/survey. Other user incentives are possible.

In some implementations, information provided by the user 210 in response to the notification 208 and/or follow-on activities can be used to create a profile for the user 210 and/or to provide content that is relevant to the user, such as for a period of time (e.g., several minutes to several hours). Moreover, any information provided by the user 210 can be used to obtain related or more detailed information and/or to provide alternate questions.

Figure 3:
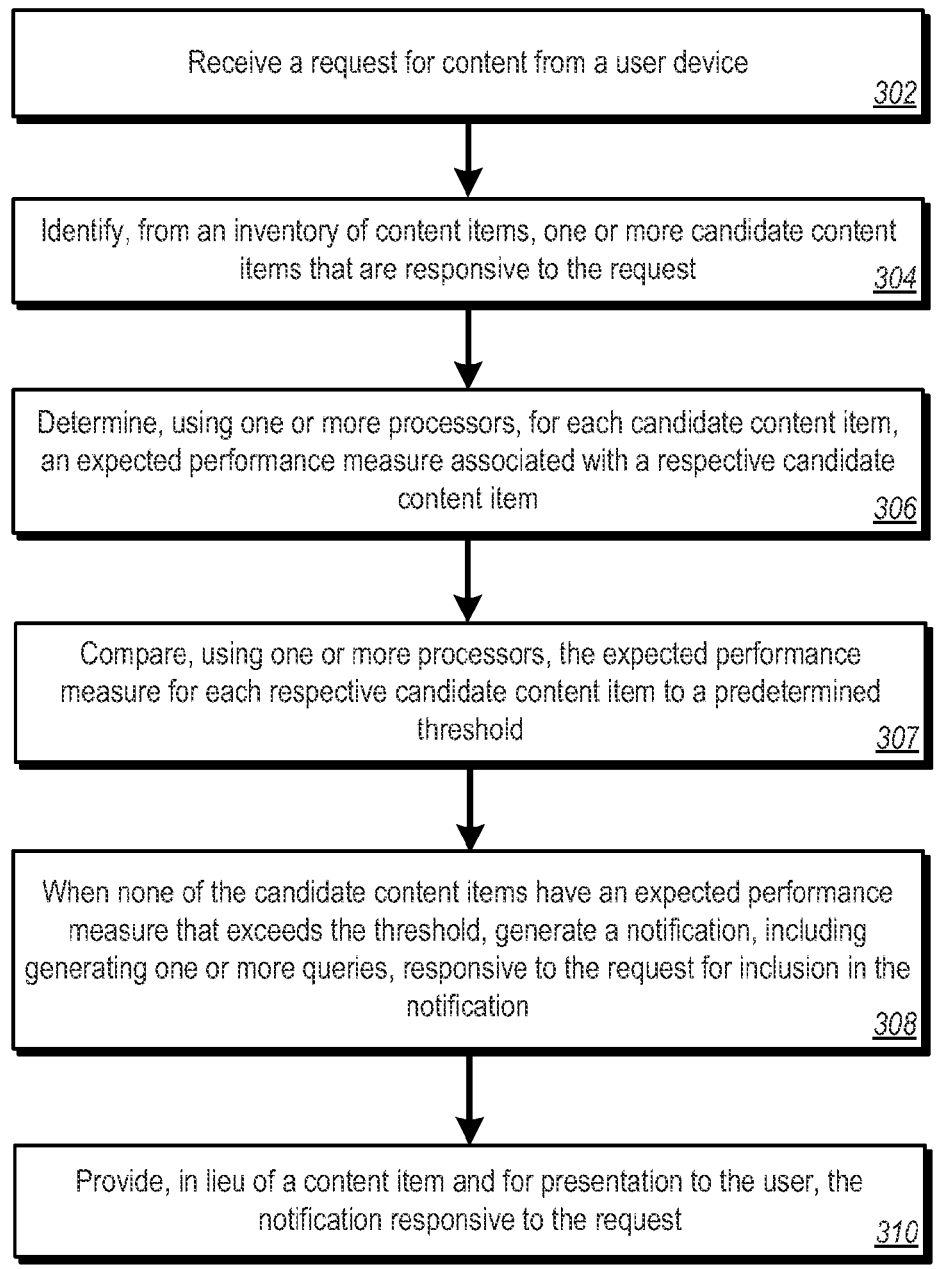
FIG. 3 is a flowchart of an example process for providing a notification, provided instead of available content items having expected performance measures exceeding a performance threshold.

FIG. 3 is a flowchart of an example process 300 for providing a notification instead of available content items having expected performance measures that do not exceed a performance threshold. In some implementations, the content management system 110 can perform steps of the process 300 using instructions that are executed by one or more processors. FIGS. 1-2 are used to provide example structures for performing the steps of the process 300.

A request for content is received from a user device (302). As an example, the content management system 110 can receive the request for content 202 that is sent from the user device 106a, e.g., to fill the content item slot 204 on the resource 206.

One or more candidate content items that are responsive to the request are identified from an inventory of content items (304). For example, the content identification engine 123 can identify candidate content items 134 from the inventory of eligible content items 132 that are responsive to the request for content 202. Identification can be based, at least in part, on matching keywords and/or other selection criteria included in the request for content 202.

For each candidate content item, an expected performance measure associated with a respective candidate content item is determined (306), and the expected performance measure for each respective candidate content item is compared to a predetermined threshold (307). The content item evaluation engine 125, for example, can evaluate the candidate content items 134. For example, evaluating can include determining, for each candidate content item, an expected performance measure 212 associated with a respective candidate content item and comparing the expected performance measure 212 for the respective candidate content item to a predetermined threshold. Each expected performance measure 212 can be compared with a predetermined threshold, e.g., one of the performance thresholds 130. For example, if all of the candidate content items 134 have expected performance measures 212 that fail to meet a predetermined threshold, then the content management system 110 can decide to provide the notification 208 instead of a content item (e.g., that may not perform well).

In some implementations, determining an expected performance measure for each candidate content item can include determining an expected click-through rate or other measure of likelihood of interaction with a respective candidate content item. For example, each determined expected performance measure 212 can indicate a likelihood of an interaction by the user 210 such as an expected click-through rate (CTR).

In some implementations, determining an expected performance measure for each candidate content item can include determining an expected revenue associated with an impression of a respective candidate content item. As an example, the content item evaluation engine 125 can determine, for any given candidate content item 134, an expected revenue amount that may be based, for example, on other factors, including an expected CTR. Expected revenue amounts can be compared, for example, to performance thresholds 130 that are related to revenue. For example, content sponsors may have designated a minimum expected revenue amount for the presentation of their content.

When none of the candidate content items have an expected performance measure that exceeds the threshold, a notification is generated, including generating one or more queries, responsive to the request for inclusion in the notification (308). The notification includes one or more queries for the user, and generating the notification can include generating the one or more queries. As an example, if the content item evaluation engine 125 determines that none of the candidate content items 134 have an expected performance measure 212 that exceeds the threshold, the notification engine 121 can generate the notification 208, as described above.

The notification is provided responsive to the request (310). The content management system 110, for example, can provide the notification 208 to the user device 106a responsive to the request for content 202.

In some implementations, generating the notification can include generating a notification that includes an explanation as to why the notification shown. As an example, the notification 208 can include language along the lines of, "We respect your time and like to give you interesting ads, though we could not find one this time."

In some implementations, generating the notification can include evaluating the request to determine the one or more queries. For example, the notification engine 121 can use information, such as keywords from the request for content 202, to generate one or more survey questions that pertain to the resource 206.

In some implementations, generating the one or more queries can include generating a query based on a category or topic that is likely to receive user input. For example, questions generated by the notification engine 121 can be based on the subject matter of the resource 206 or specific products, services or topics that are related to the resource 206. Other ways of identifying a category or topic are possible.

In some implementations, the category or topic can be selected without regard for information that is received with the request. The notification engine 121 can generate questions, such as random questions, that are not based on any of the information included in the request for content 202. Each of the questions, for example, can be designed so that user-provided answers can be used to identify relevant content to provide to the user.

In some implementations, the process 300 can further include determining an incentive to offer, and providing the incentive along with the notification. For example, the notification engine 121 can generate a notification 208 that includes language along the lines of, "As an incentive to answer these questions, we will temporarily suspend the presentation of advertisements to this web page" or "Accept this coupon for your time in completing these questions." Other incentives and messages are possible.

In some implementations, the incentive can be determined based on a category of query or one or more specific content items that relate to the query and that may be provided upon interaction by the user responsive to presentation of the notification. For example, the notification engine 121 can generate a notification 208 that includes a coupon for shoes. The notification 208 can also, upon selection by the user 210, navigate the user to a landing page of shoe-related web site and/or may cause an advertisement related to shoes to follow the selection of the incentive.

In some implementations, the process 300 can further include determining that the received request is associated with a user for which little information is known (e.g., no profile is found or available, the user is not logged in, or has enabled certain privacy controls or mode in the browser and generating the notification in response to the request based on the determining. For example, the notification 208 can include, "As it appears that you are not logged in, please answer these questions about your interests so that we can generate relevant content for you during this session." In some implementations, the information obtained based on presentation of the notification can be used during the session, then discarded.

In some implementations, the process 300 can further include receiving input responsive to providing the notification and selecting a content item to deliver from inventory based on the received input. For example, the content management system 110 can select content items for presentation to the user device 106a that are selected based, at least in part, on inputs provided by the user 210 in response to the notification 208.

Figure 4:
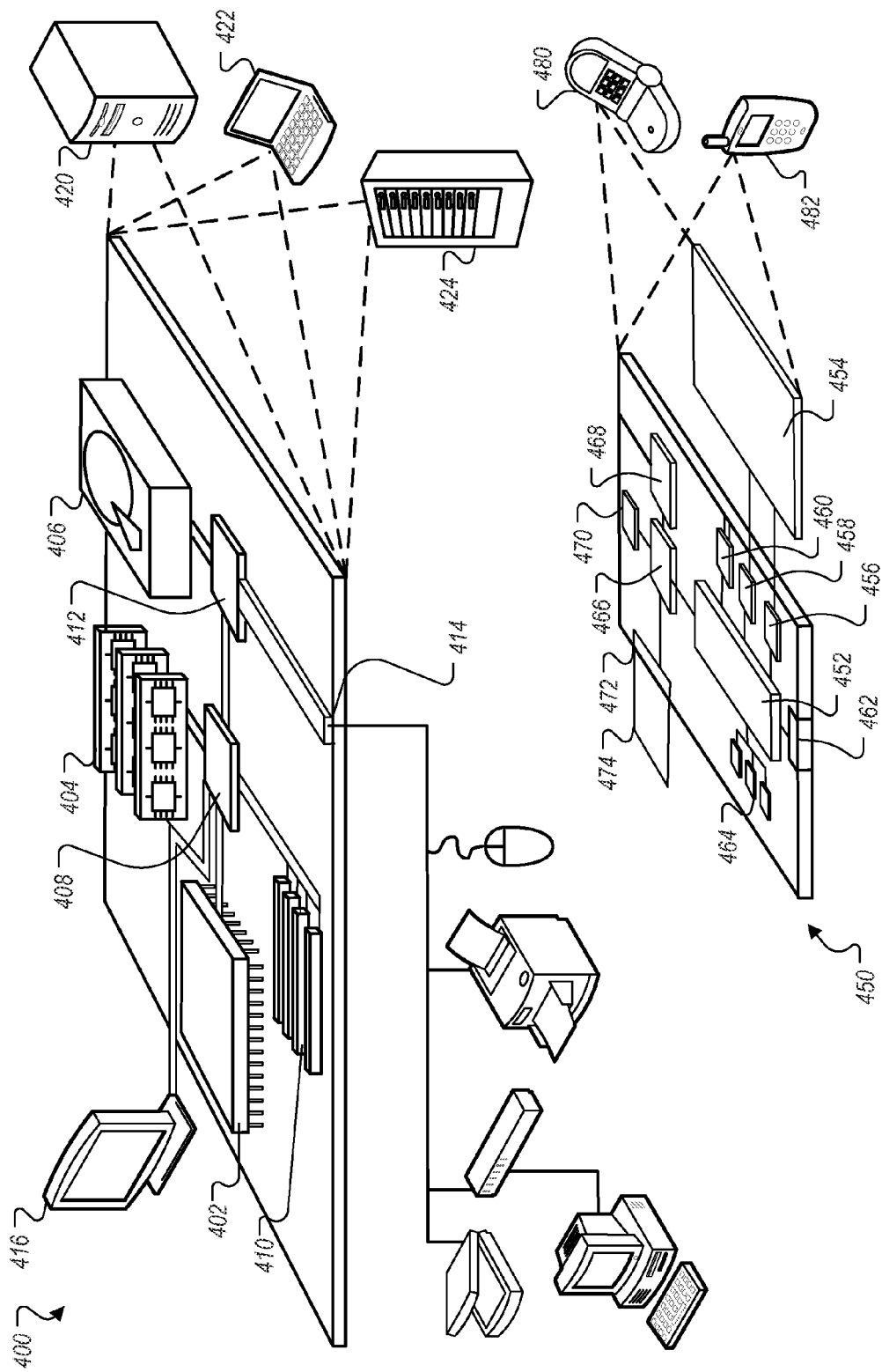
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, from a user device, a request for content that includes a keyword;
identifying, from an inventory of content items, one or more candidate content items that are responsive to the request using the keyword;
determining, using one or more processors, for each candidate content item, an expected performance measure associated with a respective candidate content item;
comparing, using one or more processors, the expected performance measure for each respective candidate content item to a predetermined threshold;
determining that none of the candidate content items have an expected performance measure that exceeds the predetermined threshold;
determining that the request for content originated from a user that is not currently logged in to a user account and that a profile of the user is not available;
generating, based on the determination that none of the candidate content items have an expected performance measure that exceeds the predetermined threshold, that the request originated from a user that is not currently logged in to a user account, and that the profile of the user is not available, a notification requesting that the user submit information about their interests; and
providing, for presentation to the user in a slot of a resource reserved for one of the candidate content items, the notification responsive to the request rather than any of the candidate content items based on none of the candidate content items having an expected performance that exceeds the predetermined threshold, the request having originated from the user that is not currently logged in to the user account, and the profile of the user not being available.

2. The method of claim 1 wherein determining, for each candidate content item, an expected performance measure includes determining a measure of likelihood of interaction with a respective candidate content item.

3. The method of claim 1 wherein determining, for each candidate content item, an expected performance measure includes determining an expected revenue associated with an impression of a respective candidate content item.

4. The method of claim 1 wherein generating the notification includes generating a notification that includes an explanation as to why the notification was shown.

5. The method of claim 1 wherein generating the notification includes evaluating the request and generating, based on the evaluating, one or more queries for inclusion in the notification, wherein the one or more queries include best-performing queries usable by the user.

6. The method of claim 5 wherein generating the one or more queries includes generating a query based on a category or topic that is likely to receive user input.

7. The method of claim 6 wherein the category or topic is selected without regard for information that is received with the request.

8. The method of claim 1 further comprising receiving input responsive to providing the notification, and selecting a content item to deliver from inventory based on the received input.

9. The method of claim 1 further comprising determining an incentive to offer, and providing the incentive along with the notification.

10. The method of claim 9 wherein the incentive is determined based on a category of a query or one or more specific content items that relate to the query and that may be provided upon interaction by the user responsive to presentation of the notification.

11. A non-transitory computer-readable medium storing including instructions, that when executed, cause one or more processors to perform operations including:
receiving, from a user device, a request for content that includes a keyword;
identifying, from an inventory of content items, one or more candidate content items that are responsive to the request using the keyword;
determining, for each candidate content item, an expected performance measure associated with a respective candidate content item;
comparing the expected performance measure for each respective candidate content item to a predetermined threshold;
determining that none of the candidate content items have an expected performance measure that exceeds the predetermined threshold;
determining that the request for content originated from a user that is not currently logged in to a user account and that a profile of the user is not available;
generating, based on the determination that none of the candidate content items have an expected performance measure that exceeds the predetermined threshold, that the request originated from a user that is not currently logged in to a user account, and that the profile of the user is not available, a notification requesting that the user submit information about their interests; and
providing, for presentation to the user in a slot of a resource reserved for one of the candidate content items, the notification responsive to the request rather than any of the candidate content items based on none of the candidate content items having an expected performance that exceeds the predetermined threshold, the request having originated from the user that is not currently logged in to the user account, and the profile of the user not being available.

12. The computer-readable medium of claim 11 wherein determining, for each candidate content item, an expected performance measure includes determining an expected click-through rate or other measure of likelihood of interaction with a respective candidate content item.

13. The computer-readable medium of claim 11 wherein determining, for each candidate content item, an expected performance measure includes determining an expected revenue associated with an impression of a respective candidate content item.

14. The computer-readable medium of claim 11 wherein generating the notification includes generating a notification that includes an explanation as to why the notification was shown.

15. The computer-readable medium of claim 11 wherein generating the notification includes evaluating the request and generating, based on the evaluating, one or more queries for inclusion in the notification, wherein the one or more queries include best-performing queries usable by the user.

16. A system comprising:
one or more processors; and
one or more memory elements including instructions that, when executed, cause the one or more processors to:
receive, from a user device, a request for content that includes a keyword;
identify, from an inventory of content items, one or more candidate content items that are responsive to the request using the keyword;
determine, for each candidate content item, an expected performance measure associated with a respective candidate content item;
compare the expected performance measure for each respective candidate content item to a predetermined threshold;
determine that none of the candidate content items have an expected performance measure that exceeds the predetermined threshold;
determine that the request for content originated from a user that is not currently logged in to a user account and that a profile of the user is not available;
generate, based on the determination that none of the candidate content items have an expected performance measure that exceeds the predetermined threshold, that the request originated from a user that is not currently logged in to a user account, and that the profile of the user is not available, a notification requesting that the user submit information about their interests; and
provide, for presentation to the user in a slot of a resource reserved for one of the candidate content items, the notification responsive to the request rather than any of the candidate content items based on none of the candidate content items having an expected performance that exceeds the predetermined threshold, the request having originated from the user that is not currently logged in to the user account, and the profile of the user not being available.

17. The system of claim 16 wherein determining, for each candidate content item, an expected performance measure includes determining an expected click-through rate or other measure of likelihood of interaction with a respective candidate content item.

18. The system of claim 16 wherein determining, for each candidate content item, an expected performance measure includes determining an expected revenue associated with an impression of a respective candidate content item.

19. The system of claim 16 wherein generating the notification includes generating a notification that includes an explanation as to why the notification was shown.

20. The system of claim 16 wherein generating the notification includes evaluating the request and generating, based on the evaluating, one or more queries for inclusion in the notification, wherein the one or more queries include best-performing queries usable by the user.

* * * * *